Oct. 20, 1970    H. HAVERKAMP    3,535,568
SHADED-POLE MOTOR HAVING AN ELECTROMAGNETICALLY
OPERATED BRAKING DEVICE
Filed April 19, 1968

Inventor:
Hans Haverkamp
By: Spencer & Kaye
Attorneys

United States Patent Office 3,535,568
Patented Oct. 20, 1970

3,535,568
SHADED-POLE MOTOR HAVING AN ELECTRO-
MAGNETICALLY OPERATED BRAKING DEVICE
Hans Haverkamp, Lipperreihe, near Bielefeld, Germany,
assignor to Hanning Elektro-Werke Robert Hanning,
Bielefeld, Germany
Filed Apr. 19, 1968, Ser. No. 722,795
Claims priority, application Germany, Apr. 21, 1967,
H 62,499
Int. Cl. H02k 7/10
U.S. Cl. 310—77                                    1 Claim

ABSTRACT OF THE DISCLOSURE

A shaded-pole motor is equipped with a braking device having an armature arranged to be attacted by the rotor of the motor against the action of a spring to release the brake. In order to render more steady the attraction force exerted by the rotor of the motor, the latter is provided with a magnetic system which produces magnetic fields phase-displaced in time with respect to the said main magnetic field.

This invention relates to an electromagnetically operated braking device which is suited to be used for shaded-pole motors and the armature plate of which is attracted by the magnetic field of the short-circuited winding of the rotor against the action of a spring.

Braking devices of this kind are known. It has been proposed for instance in the German patent specifications Nos. 664,822 and 694,094, in the German specification No. 1,043,483 open to public inspection, as well as in the French specification No. 815,879, to provide electric motors with a magnet system, wherein a movable armature, which is conically shaped in these cases, is pulled against the rotor of the motor by the action of the magnetic flux in order to release the brake. Other such devices are described in the German patent specification Nos. 943,071 and 1,057,686 for induction motors, wherein magnetic systems are associated with the squirrel-cage rotor and are energised both by the main flux and by the ring current and attract a movable armature plate as a result.

All the constructions mentioned are obviously based on the intention to equip induction motors with such a braking device in as much as not one of these systems is suited to be used for a shaded-pole motor.

A shaded-pole motor has essentially only one main field which produces a pulsating magnetic flux. This main field, is, however, not capable of firmly holding the armature plate which is under the action of a spring, so that the armature plate produces a humming noise which is not acceptable. It is the object of the invention to overcome this difficulty and to provide a braking device suited particularly for shaded-pole motors.

This object is solved by a novel construction of shaded-pole motors associated with an axially movable armature plate, which differs from constructions hitherto known in that the rotor stack of laminations, where it faces the armature plate, is provided with a magnetic system which is energised by the short-circuited winding and consists of two rows of pole-pieces which grasp claw-like the associated short-circuit ring, and that the radially inner pole pieces are also surrounded by the short-circuit ring at the side facing the rotor shaft so as to produce individual secondary current circuits around each of the said inner pole shoes.

For the manufacture of the rotor to be used for the shaded-pole motor according to the invention, it is a particular advantage to make the rows of pole pieces by punching and stamping of ductile metal sheets which are placed into the mould before the rotor winding is made by casting and which, when the short-circuit rings are cast, are embedded into the material used for the short-circuit rings.

A constructional example of the invention will now be described with reference to the accompanying drawings. For the sake of simplicity, only the magnetic system of the rotor has been shown in the illustrations and not the braking device as such in as much as the latter can always be easily adapted to the particular requirements.

Figure 1:
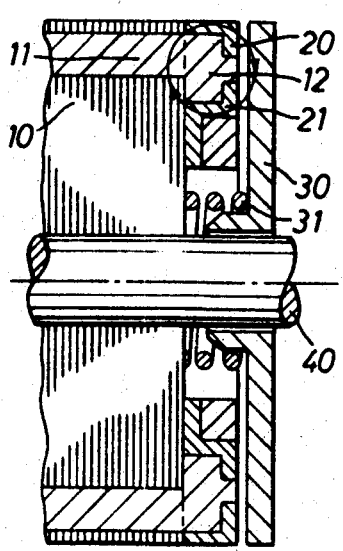
FIG. 1 shows a partial longitudinal section of the rotor of a shaded-pole motor comprising the features according to the invention, the section being along line A in FIG. 3.
Figure 2:
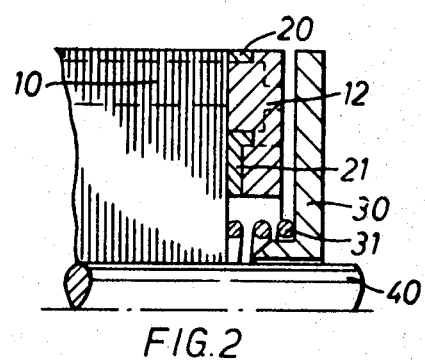
FIG. 2 is a partial section similar to that of FIG. 1 but taken along section line B in FIG. 4.
Figure 3:
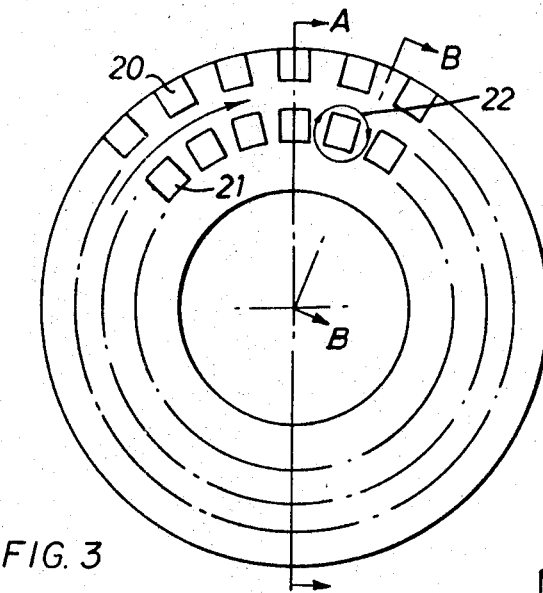
FIG. 3 shows an end view of the rotor, the armature plate being removed, FIG. 4 explains the variations of the pulling force P exerted by the magnetic system.

The stack or rotor laminations 10, consisting of individual stamped sheets, carries in correspondingly stamped slots a short-circuited winding 11. A short-circuit ring 12 is in contact with the short-circuited winding 11 at each end of the rotor. A magnetic system is provided at the end of the rotor that faces the armature plate 30 of the brake device and consists of two rows of pole pieces 20 and 21 which claw-like grasp the short-circuit ring 12. The magnetic system is in direct contact with the rotor stack of lamination 10 and is energised by the short-circuited winding 11 so that, when the motor is switched on, the armature plate 30 is attracted by the magnetic force against the action of the spring 31. The resulting course of the lines of force is indicated by a circle shown in FIG. 1.

In order to hold the armature plate 30 by the magnetic system, formed by the rows 20 and 21 of pole pieces, in such a manner that no humming noise is produced, it is necessary to produce a second flux component which is displaced in phase with respect to the main magnetic field and which, together with the main magnetic field, prevents the magnetic force of attraction from dropping to zero. This is achieved by surrounding the radially inner pole pieces 21 by the short-circuit ring also at the side facing the rotor shaft 40. As a result, a secondary current circuit 22 is formed around each pole piece 21 which in turn produces a corresponding phase-displaced secondary field.

Figure 4:
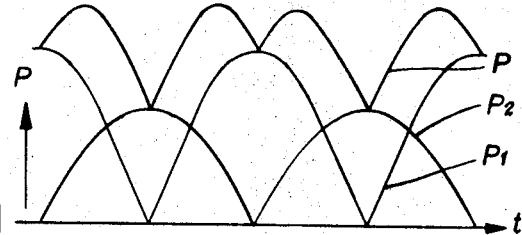

FIG. 4 indicates how the total attraction force P is produced by the flux component $P_1$ of the main field and by the phase-displaced component $P_2$ of the secondary field.

Figure 5:
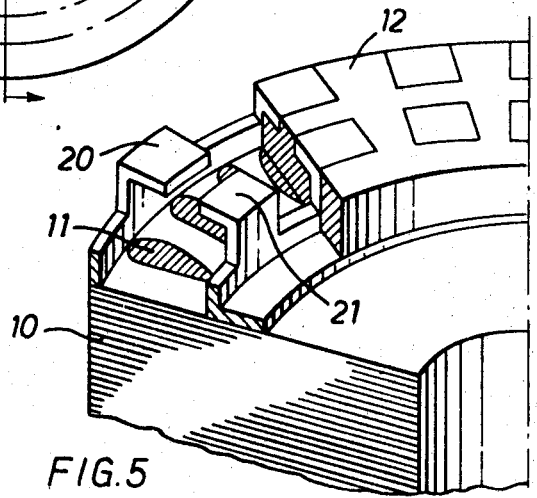
FIG. 5 represents a perspective view of a sector of the magnetic system with which the rotor is provided.

The constructions of the magnetic system described is best recognisable from the perspective representation shown in FIG. 5.

Since shaded-pole motors are low-power motors such as are used for instance for the drive of clothes spin driers and other domestic devices which are manufactured in large numbers, it is desirable to ensure a particularly economical manufacture of the braking device. Therefore it is proposed to make the rows of pole pieces 20 and 21 in a simple manner by punching and stamping of ductile sheet metal. They are placed into the mould before the rotor is cast so that, when the short-circuit ring 12 is cast, they are surrounded and firmly embedded in the light metal which is used for this purpose.

What I claim as new and desire to secure by Letters Patent of the United States is:

1. In combination, a shaded-pole electric motor and electromagnetically actuated brake armature comprising a laminated rotor, a short circuit ring at one end of said rotor, a first ring of pole pieces extending into said short circuit ring from one periphery thereof for producing a magnetic field which fluctuates with the rotor current, a second ring of pole pieces surrounded by the material of said short circuit ring for producing both the fluctuating magnetic field and a magnetic field out of phase with said magnetic field produced by said first ring of pole pieces and a magnetic brake armature for attraction by said rings of pole pieces.

References Cited

UNITED STATES PATENTS

| | | | |
|---|---|---|---|
| 2,879,417 | 3/1959 | Sorchy | 310—77 |
| 3,032,667 | 5/1962 | Sorchy | 310—77 |
| 3,407,319 | 10/1968 | Arraiza | 310—77 |

FOREIGN PATENTS

| | | |
|---|---|---|
| 1,276,800 | 9/1968 | Germany. |

MILTON O. HIRSHFIELD, Primary Examiner

MARK O. BUDD, Assistant Examiner

U.S. Cl. X.R.

310—172